United States Patent [19]

Yasuhara

[11] Patent Number: 4,506,337
[45] Date of Patent: Mar. 19, 1985

[54] ENGINE LUBRICATING OIL REPLACEMENT TIMING MONITORING SYSTEM AND METHOD FOR AN AUTOMOTIVE VEHICLE

[75] Inventor: Seishi Yasuhara, Yokosuka, Japan
[73] Assignee: Nissan Motor Company, Limited, Yokohama, Japan
[21] Appl. No.: 395,839
[22] Filed: Jul. 6, 1982
[30] Foreign Application Priority Data
  Jul. 29, 1981 [JP] Japan ................................ 56-118694
[51] Int. Cl.³ ............................................. G01D 21/00
[52] U.S. Cl. .................................... 364/550; 73/117.3; 123/196 S; 340/52 R; 364/424; 364/551
[58] Field of Search ............... 364/424, 550, 551, 552; 340/52 R, 52 F; 73/10, 64, 117.3; 123/196 S, 198 D; 184/6.5, 6.6, 6.7, 6.8

[56] References Cited
  U.S. PATENT DOCUMENTS
  4,007,629 2/1977 Hochstein ................................ 73/64

Primary Examiner—Gary Chin
Assistant Examiner—Edward Cosimano
Attorney, Agent, or Firm—Schwartz, Jeffery, Schwaab, Mack, Blumenthal & Koch

[57] ABSTRACT

A microcomputer system for indicating that engine lubricating oil should be exchanged when the working life of the engine lubricating oil is over. The system comprises: (a) a first sensor which detects and signals the number of engine revolutions per time; (b) a second sensor which detects the load on the engine; (c) a calculating means which calculates the amount of soot suspended in the lubricating oil during the operation of engine on a basis of the output values of the first and second sensors; (d) a memory means which adds up and stores the calculated amount of soot so as to record a total amount of soot; (e) a judging means which judges whether the total amount of soot in the lubricating oil exceeds a predetermined amount; and (f) an alarm unit which produces an alarm in a predetermined form to request a lubricating oil change when the total amount of soot exceeds the predetermined amount, whereby the working life of the engine lubricating oil can more accurately be determined.

24 Claims, 14 Drawing Figures

ENGINE LUBRICATING OIL REPLACEMENT TIMING MONITORING SYSTEM AND METHOD FOR AN AUTOMOTIVE VEHICLE

BACKGROUND OF THE INVENTION

1. Field of the Invention

The present invention relates to a method and system using a microcomputer for notifying a vehicle driver that the engine lubricating oil should be replaced when the life of lubricating oil has ended.

2. Description of the Prior Art

Conventional methods of determining the replacement timing for engine lubricating oil rely on the fact that when the vehicle has travelled a distance specified by an automotive vehicle's manufacturer or oil supplier, the lubricating oil is recommended to be replaced with new lubricating oil. The change timing of lubricating oil can vary depending on the user's own decision or otherwise the recommendation of a serviceman of a gas station, since there is no definite index for such a replacement determination. The reason that the life of the lubricating oil is usually determined by the total travel distance is that deterioration of the lubricating oil due to aging and thermal load and the amount of soot intermixed or suspended in the lubricating oil, particularly in a diesel engine, is directly related to the total distance of travel.

However, such a conventional method of determining the oil exchange timing is based on a prediction from empirical data, and not on the individual operating conditions. In other words, since the impurities suspended in the lubricating oil depend strictly on the number of engine revolutions, load, EGR rate (Exhaust Gas Recirculation) and so forth, the life calculated solely from the total distance of travel does not always agree with the real life of the oil.

Therefore, there is a problem in that excessively prolonged use of lubricating oil under severe operating conditions shortens engine life and excessively premature replacement of lubricating oil is ineconomical since there is no definite way to determine the optimum change timing for lubricating oil.

SUMMARY OF THE INVENTION

With the above-described problem in mind, it is an object of the present invention to provide a system and method for monitoring aging of an engine lubricating oil and notifying the vehicle driver of an appropriate lubricating oil replacement timing. This can be achieved by calculating the amount of impurities, i.e., soot intermixed into the lubricating oil in accordance with various engine operating parameters since the amount of impurities in the lubricating oil determines predominantly the life of the oil and the amount of impurities can be derived on the basis of engine operating conditions.

BRIEF DESCRIPTION OF THE DRAWINGS

The features and advantages of the present invention will be appreciated from the following description and drawings in which like reference numerals designate corresponding elements and in which.

DETAILED DESCRIPTION OF THE PREFERRED EMBODIMENTS

Reference will be made hereinafter to the drawings attached.

First, grounds for maintaining that the life of an engine lubricating oil can be obtained on a basis of an amount of soot suspended in the oil is described hereinbelow.

Figure 1:
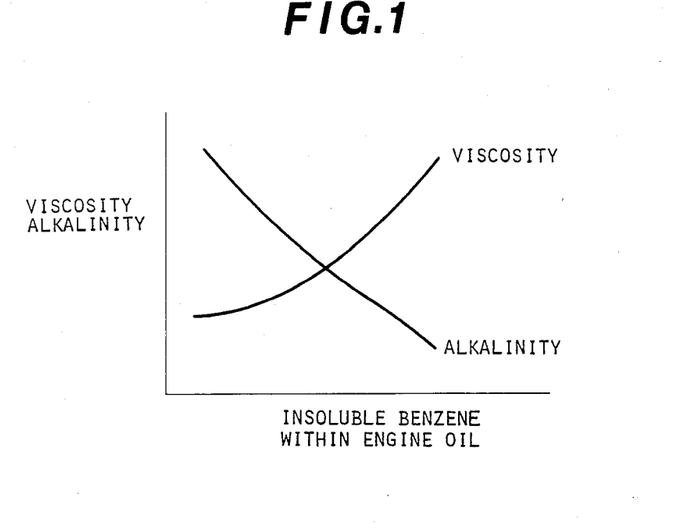
FIG. 1 is a graph representing the relationship between the percentage by weight of insoluble benzene in engine lubricating oil and the oil viscosity and alkalinity.

FIG. 1 shows a relationship of engine lubricating oil viscosity and alkalinity with respect to the amount of insoluble benzene (weight %) suspended in the engine lubricating oil (the soot consist largely of insoluble benzene).

As the amount of insoluble benzene increases, the oil viscosity increases while the alkalinity decreases. The alkalinity serves to neutralize acidity caused by ions in the engine fuel so that destruction of the oil film due to acidity can be prevented. Therefore, the decrease of alkalinity results in the weakening of neutralization. Consequently, destruction of the oil film and increase of engine abrasion (and possible seizure) can be brought about. Hence, one of the definitions of engine oil aging includes the increase in the amount of insoluble benzene and consequent decrease of alkalinity.

On the other hand, the oil viscosity is an important factor for forming the oil film. Insufficient viscosity makes it difficult to maintain the oil film. Excessive viscosity increases frictional losses, since the lubricating oil cannot evenly disperse throughout the engine due to pressure loss in lubricating oil system. Therefore, the oil viscosity must be maintained at a proper value.

The soot consisting largely of insoluble benzene serves as an agent for promoting abrasion, especially the abrasion of cam surfaces having high contact pressure, valve tips, piston rings, and cylinder walls.

As described hereinabove, the life of the oil is determined by the soot suspended in the lubricating oil. Therefore, it is necessary to accurately measure the amount of soot. There is a relationship shown hereinbelow between the amount of soot suspended in the oil, exhaust gas smoke intensity, intake air flow rate per engine cycle, EGR rate, and carbon weight ratio:

$$Ts = 20.4 Sm^{2.1} \times V \times (0.16e + 0.04) \times k^{-1} \quad (1)$$

where Ts is a rate of amount of soot suspended in the oil in mg/km, Sm is exhaust gas smoke output in Bosch Smoke Units, V is the intake air flow rate in m³/km, e is EGR rate included in the intake air, k is the carbon content of the soot by weight.

The equation established as described above is an empirical formula. The soot within each cylinder of the engine is first deposited on the cylinder walls and scraped off by means of the piston rings into the engine lubricating oil.

Figure 2:
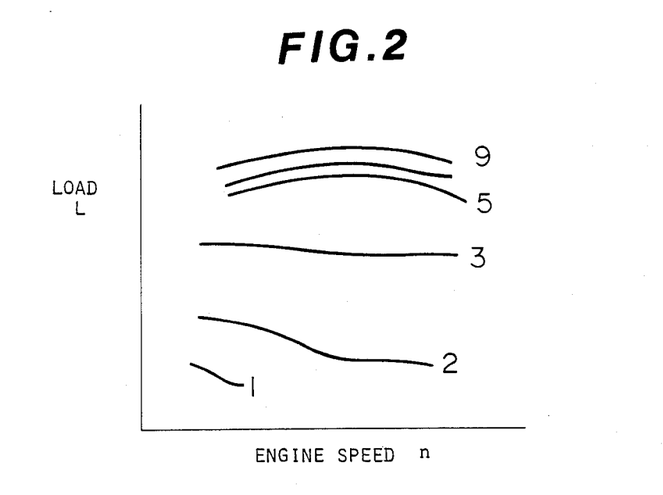
FIG. 2 is a graph relating exhaust gas smoke intensity to engine speed and load.

As shown in FIG. 2, the exhaust gas smoke output Sm is determined by engine load L and engine speed n. Therefore, the smoke value Sm can be expressed in the following manner:

$$Sm = f_1(n, L).$$

Although it is difficult to calculate the smoke output Sm from the load L and engine speed n, the values shown graphically in FIG. 2 can previously be stored in memory within a microcomputer so as to be available for read-out via a table look-up technique.

The amount of gas entering the cylinders of the engine V indicates an intake air flow rate of the engine. V can be expressed as:

$$V = 3 \times 10^4 C \eta V \div V_{1000},$$

where
C: Engine total displacement (m³)
$\eta V$: Volumetric Efficiency of Engine (%)
$V_{1000}$: Vehicle Speed when the engine speed is 1000 rpm (km/h)

Figure 3:
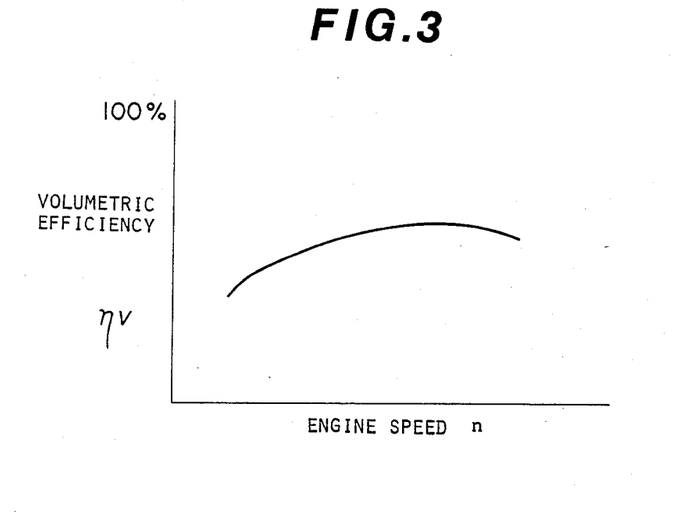
FIG. 3 is another graph relating volumetric efficiency to engine speed.

Since the volumetic efficiency $\eta V$ varies according to engine speed n as shown in FIG. 3 and C and $V_{1000}$ are constants, V can also be expressed as:

$$V = Co f_2(n)$$

provided that $$Co = 3 \times 10^4 \times C \div V_{1000}$$

The values shown graphically in FIG. 3 can be stored in memory in the microcomputer so as to be available for read-out via the table look-up technique.

Figure 4:
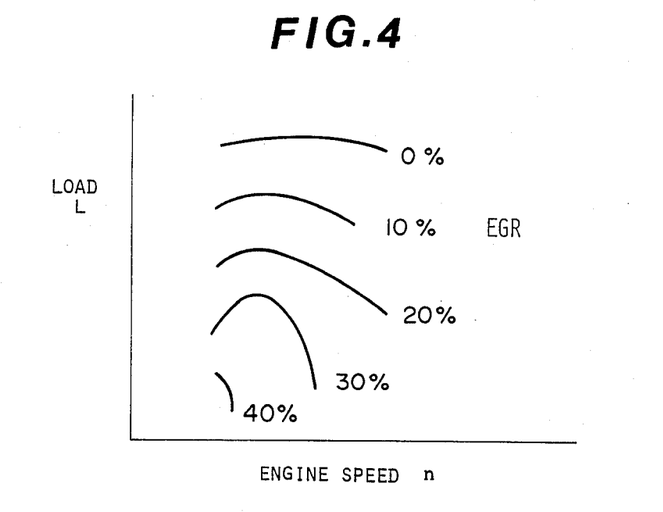
FIG. 4 is still another graph relating EGR rate to engine speed and load.

In addition, e(EGR rate) has a value of 0 if the EGR system is not used and can be expressed as $e = f_3(n, L)$ for a given engine model. The relationship of the EGR rate e with respect to the engine load L and engine speed n is shown in FIG. 4. The EGR rate value as shown in FIG. 4 can be stored in memory in the same way as the exhaust gas smoke output Sm and volumetric Efficiency $\eta V$ described hereinabove.

Furthermore, k denotes the proportion of carbon in the soot to be measured by a smoke meter and has a constant value, e.g., 50%, determined by the model number of the engine.

In this way, the dynamic amount of soot suspended in the engine lubricating oil per travel distance Ts (mg/km) can be expressed as:

$$Ts = 20.4 f_1(n,L)^{2.1} \times Co f_2(n) \times (0.16 \times f_3(n,L) + 0.04) \times k^{-1}.$$

Thus, Ts can immediately be obtained from the engine load L and engine speed n and a total amount of soot T after the vehicle has traveled for a given interval of time can approximately be obtained in the following equation:

$$T(mg) = Ts \times \frac{n \times V_{1000}}{1000} \times t, \quad (2)$$

where t is the travel duration in hours.

When the weight ratio P of the engine lubricating oil is obtained by total oil weight Wo and the total amount of soot T (P = T/Wo) and the value arrives at a predetermined limit value corresponding to the onset of dangerous conditions in the lubricating oil, the useful life of the lubricating oil is over.

Figure 5:
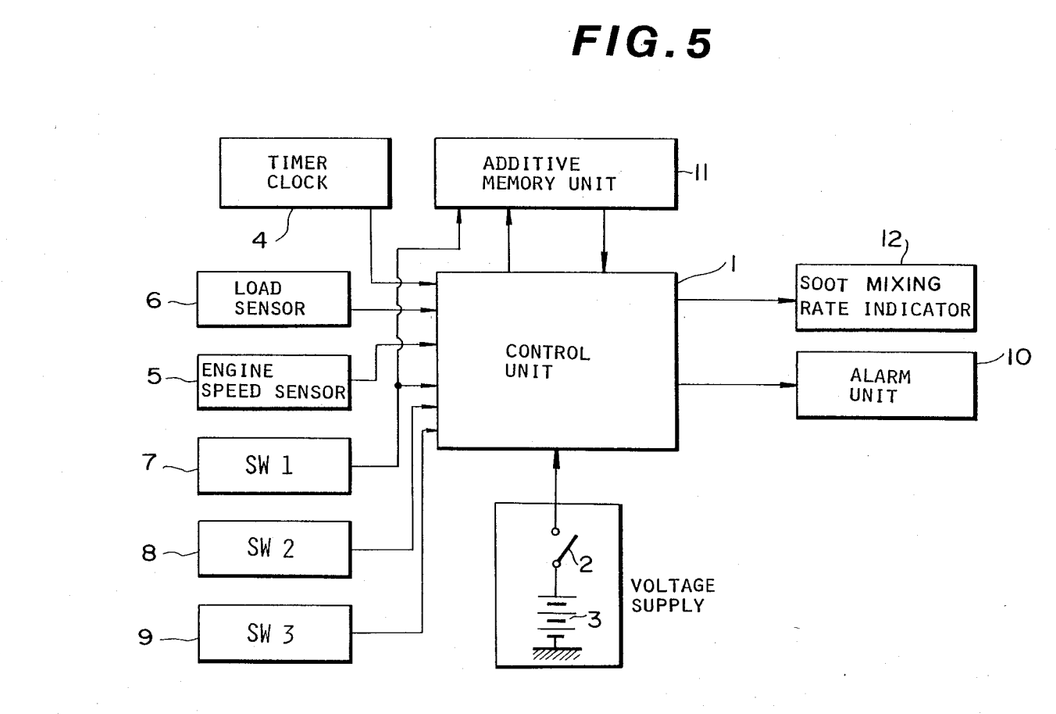
FIG. 5 is a simplified block diagram showing an entire configuration of an engine lubricating oil replacement timing monitoring system according to the present invention.

FIG. 5 shows a preferred embodiment of the oil replacement timing monitoring system according to the present invention. Numeral 1 denotes a microcomputer having a Central Processing Unit (CPU), Random Access Memory (RAM), Read Only Memory (ROM), and I/O Interface, in which various calculating and data processing operations are sequentially carried out on a basis of programmed routine. Input units of the microcomputer 1 include an engine speed sensor 5, load sensor (fuel injection amount per time) 6, a clear switching unit $SW_1$ (7) for clearing a memory location at the end of each oil change, fuel select switch $SW_2$ (8) which indicates the nature of the current fuel, oil select switch $SW_3$ (9) which indicates the impurity-resistance quality of the current engine lubricating oil and clock timer 4. Output Units include an alarm unit 10 such as a buzzer and indicator 12 for the percentage of soot suspended in the oil. In addition, a DC voltage supply such as a battery 3 is connected to the microcomputer via an engine key switch 2.

Numeral 11 denotes a memory unit which stores the results of working life calculations for the lubricating oil. Memory unit 11 consists of a nonvolatile memory device or a device which stores a memory value permanently irrespective of whether the power is cut off comprising a step motor and variable resistor to be described hereinafter.

Figure 6:
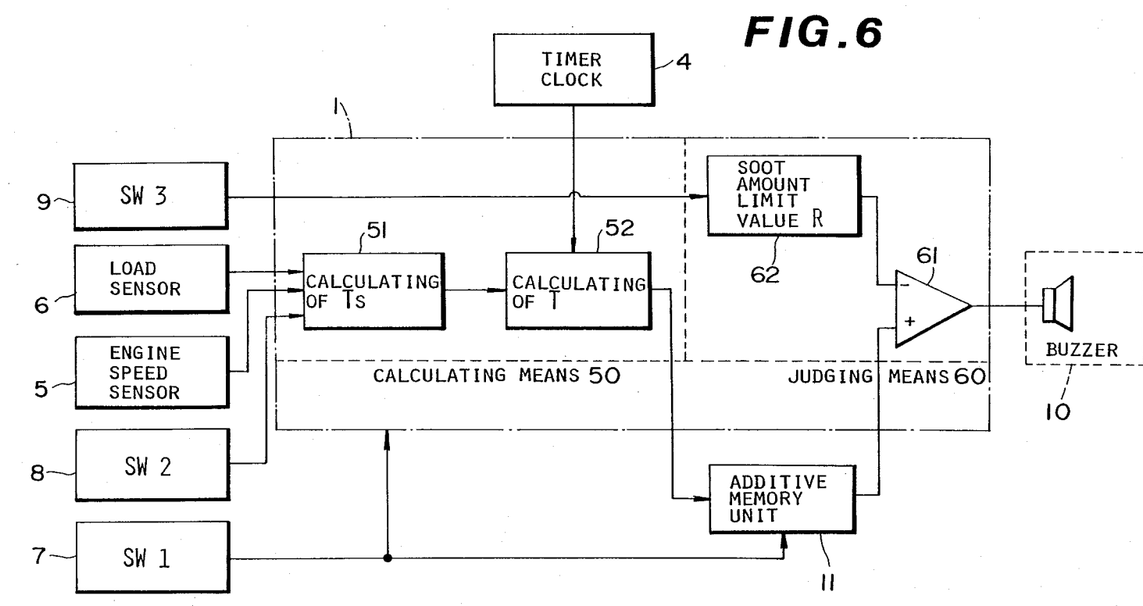
FIG. 6 is an internal functional block diagram of control unit 1 shown in FIG. 5.

FIG. 6 is a functional block diagram of the microcomputer shown in FIG. 5. The functions of microcomputer 1 are divided generally into the categories of impurity, i.e., soot accumulation calculation, performed in a calculating means 50, and impurity content monitoring, performed in a judging means 60.

Judging means 60 includes a comparator 61 and impurity limit setting means 62 which produces a signal indicative of the maximum allowable impurity content in the lubricating oil in response to the oil quality signal from the oil select switch $SW_3$. The comparator 61 receives signals from the additive memory unit 11 and setting means 62 indicative of the current and the maximum allowable impurity content levels, respectively. The comparator 61 outputs an activating high-level output to the alarm unit 10 when the current impurity level exceeds the maximum limit. The calculating means 50 is divided into two blocks 51 and 52. The first block 51 calculates the dynamic amount of soot Ts and subsequent second block calculates the amount of soot T in such a equation as described in Equation (2) on a basis of the calculated value Ts.

Figure 7:
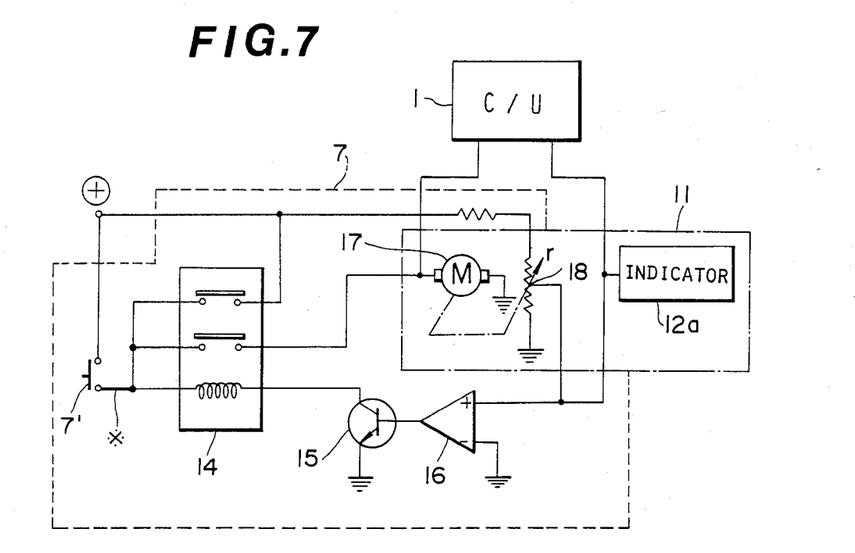
FIG. 7 is a partial circuit diagram of the lubricating oil replacement timing monitoring system shown in FIG. 5.

FIG. 7 shows a circuit configuration of the clear switching unit 7 including a clear switch 7' and the related memory unit 11 wherein the motor and variable resistor are used.

When the clear switch 7' is pushed, a self-holding relay 14 is turned on and a comparator 16 outputs a high level voltage signal unless a resistance value, i.e., memory value r of a variable resistor 18, indicates zero. Therefore, a transistor 15 turns on so that the relay 14 remains on and step motor 17 continues to rotate. Since the resistance value r of the variable resistor 18 changes depending on the motor's rotation, the resistance value, i.e., memory value r, eventually returns to zero. When the resistance value reaches zero, the motor 17 stops with the transistor 15 turned off.

As shown in FIG. 6, the microcomputer 1 first initializes in an initial sequence, wherein the memory value r is returned to zero through the clear switching unit 7 upon the completion of replacement of the engine lubricating oil. The microcomputer 1 thereafter receives current data on the number of engine revolutions per unit time n, engine load L, and correction factor $\alpha$ from the fuel select switch 8 and calculates the dynamic amount of soot per unit travel distance Ts according to the table look-up technique. If the magnitude of Ts is indicated on a pointer instrument 12, the percentage of soot suspended in the oil, i.e., deterioration of the oil can be indicated directly to the driver. The dynamic amount of soot Ts is calculated at a timing when either the engine speed n or load L changes. The engine speed n or load L to be calculated thereat is that immediately before the change occurs. If there is a change in neither the engine speed n nor load L, the dynamic amount of soot Ts is not calculated and only a processing time of the control unit 1 to repeat the programmed routine is additively accumulated during a time interval for which no such change occurs. The timer clock 4 outputs an interrupt signal into the second block 52 of the calculating means 50 for commanding the second block 52 to calculate the current static amount of soot T whenever a predetermined interval of time has passed so as to prevent the calculated result of T from exceeding a maximum value at which the motor (described in detail hereinafter) can rotate one pitch. The interrupt signal outputted from the timer clock 4 is enabled at the second block 52 only when there is a change in neither the engine speed n nor load L.

The calculated result of T is accumulated and sent into the additive memory unit 11 to provide a total amount of soot suspended in the lubricating oil. If the total amount of soot thus obtained arrives at a limit value R set in the judging means 60, an alarm signal is outputted to the alarm unit 10 so as to produce an alarm through, e.g., buzzer for notifying the vehicle's occupant that the lubricating oil should be changed.

It should be noted that if an abrupt change occurs in either the engine speed n or load L, the dynamic amount of soot Ts is calculated and the static amount of soot T is immediately calculated at each interval of processing time of the control unit 1.

Figure 8A:
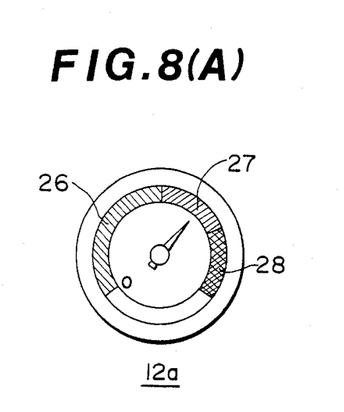
FIG. 8(A) is a front view of an oil replacement indicator preferably used in the monitoring system according to the present invention which displays the aging condition of engine lubricating oil in terms of the total amount of soot suspended in the lubricating oil currently being used.
Figure 8B:
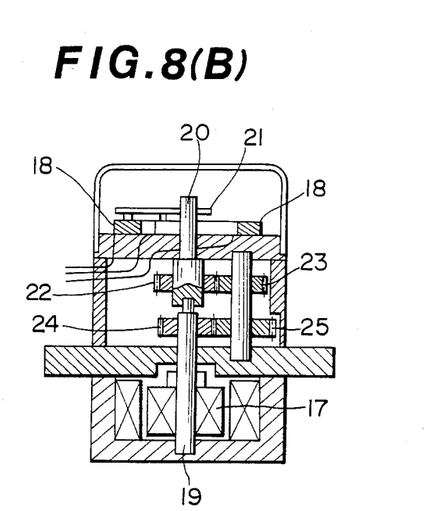
FIG. 8(B) is a partially sectioned side view of a construction of a variable resistor and step motor used as a memory unit shown in FIG. 7.

FIG. 8(A) shows an oil replacement indicator 12a of a pointer type preferably provided within the memory unit 11. FIG. 8(B) shows a relation between the motor 17 and variable resistor 18. In FIG. 8(B), numeral 17 denotes the motor also shown in FIG. 7, the rotational force thereof being transmitted to a brush 21 attached to an upper end of a rotatable shaft 20 via a motor shaft 19 and reduction gears 22, 23, 24, and 25 so that the resistance value, i.e., memory value r of the variable resistor 18 can be varied continuously. It will be seen that in FIG. 8(B) two wires withdrawn from the variable resistor 18 are connected to the plus voltage supply via a resistor and connected to ground, one wire from the brush is connected to the comparator 16 as shown in FIG. 7. The resistance value r can be indicated by means of a pointer indicator 12a, e.g., voltage meter of the DC moving-coil type such as that shown in FIG. 8(A). In FIG. 8(A), a first area denoted by numeral 26 preferably in blue indicates that the lubricating oil does not need to be exchanged, a second area denoted by numeral 27 preferably in yellow indicates that the lubricating oil is becoming deteriorated, and a third area denoted by numeral 28 preferably in red indicates that the lubricating oil needs to be changed. Preferably, at the full stroke position of the pointer, a buzzer of the alarm unit 10 is sounded. It should be noted that the full stroke position, in this case, corresponds to the maximum value R of the variable resistor 18.

Figure 9A:
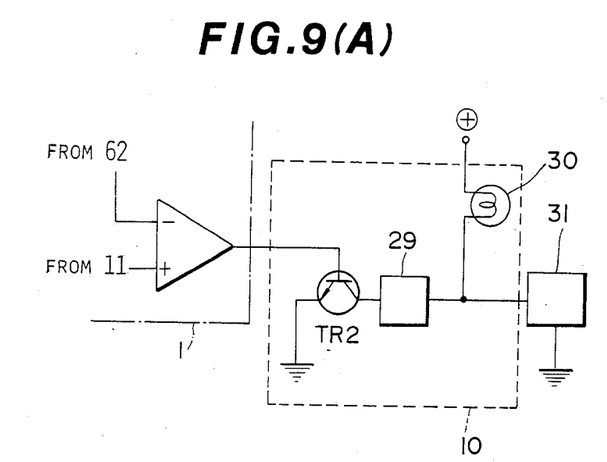
FIG. 9(A) is a partial circuit diagram of the engine lubricating oil replacement timing monitoring system shown in FIG. 5 showing an alternative alarm unit for the buzzer shown in FIG. 6.

FIG. 9(A) shows an alternative of the alarm unit 10 using the buzzer.

A base terminal of a second transistor TR2 is connected to the corresponding output terminal of the microcomputer 1. The emitter thereof is grounded. The collector thereof is connected to a plus bias voltage supply via a warning lamp 30 and a lamp blinking unit 29. When a high-level voltage signal is received from the microcomputer 1, the second transistor TR2 turns on so that a lamp 30 is blinked by means of the lamp blinking unit 29. Numeral 31 denotes a conventional pneumatic oil pressure warning switch unit which actuates the lamp 30 to turn on when the lubricating oil supply is insufficient.

Figure 9B:
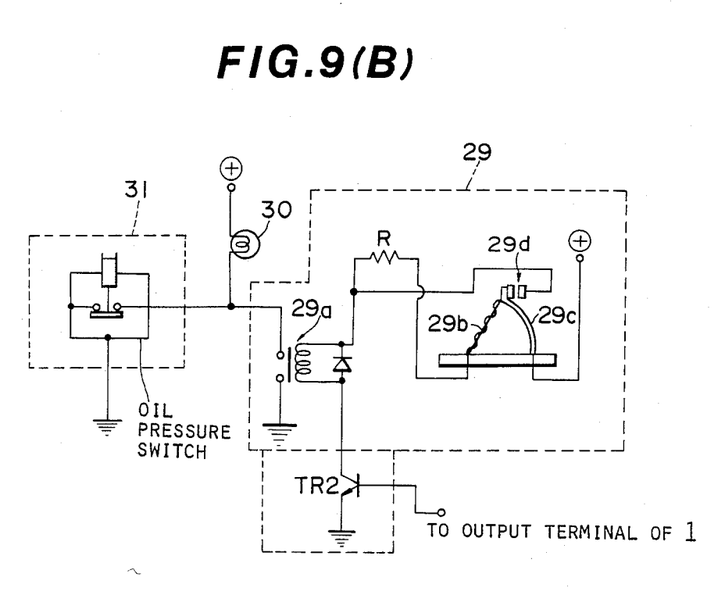
FIG. 9(B) is an exemplified circuit diagram of a lamp blinking unit 29 shown in FIG. 9(A)

FIG. 9(B) is a detailed circuit configuration of an example of the lamp blinking unit 29. The unit 29 includes a relay 29a with an electromagnetic coil and a contact connected to the warning lamp 30 one end of the former being connected to the second transistor TR2 and the other end thereof being connected to one end of a hot wire 29b via a resistor R and directly to one of a pair of contacts 29d. One end of a leaf spring 29c is connected to the other of the pair of contacts 29d which in turn is connected to the hot wire 29b and the other end thereof is connected to the plus voltage supply. When the second transistor TR2 is turned on, a current flows through the leaf spring 29c, hot wire 29b, resistor R, coil of the relay 29a, and second transistor TR2. However, in this case the relay 29a cannot turn the contact on so as to light on the warning lamp 30 because of insufficient power due to the presence of the resistor R. As the current flows through the hot wire 29b, the hot wire 29b expands so that the pair of contacts 29d eventually close. Consequently, the coil of the relay 29a receives a larger current through the flat spring 29c and the pair of contacts 29d, bypassing the resistor R. Therefore, the contact of the relay 29a is closed to light the lamp 30. After a predetermined interval of time, the hot wire 29b cools and contracts because no current is flowing therethrough. Thereafter, the contacts 29d again separate and consequently the lamp 30 is extinguished. In this way, the lamp 30 is turned on and off repeatedly.

It should be noted that an astable multivibrator, etc., may alternatively be used to repeatedly turn on and off the warning lamp 30 in place of the arrangement shown in FIG. 9(B).

It should also be noted that the fuel select switch 8 shown in FIG. 6 provides different bit patterns for the microcomputer 1 depending on the kind of fuel supplied to the engine. Different kinds of fuel have different exhaust gas smoke output values. Therefore, if the manufacturer specifies previously the bit pattern according to the kind of fuel, the microcomputer 1 can perform a correction for the percentage of the amount of soot suspended in the oil Ts by multiplying a correction factor α to the calculated result Ts. Consequently, a more accurate calculation of the oil deterioration can be made.

Furthermore, the oil select switch 9 provides a different bit pattern for the microcomputer 1 depending on which kind of lubricating oil is used in the engine since the service life of the lubricating oil with respect to the calculated amount of soot T depends on the kind of lubricating oil being used. According to the bit pattern of the oil select switch 9, a limit value R, which indicates the life of lubricating oil, is modified. Therefore, the time at which the lubricating oil should be changed can be extended or shortened depending on the kind of lubricating oil being used in the engine. Each bit pattern of the oil select switch 9 is previously specified by the manufacturer.

Figure 10:
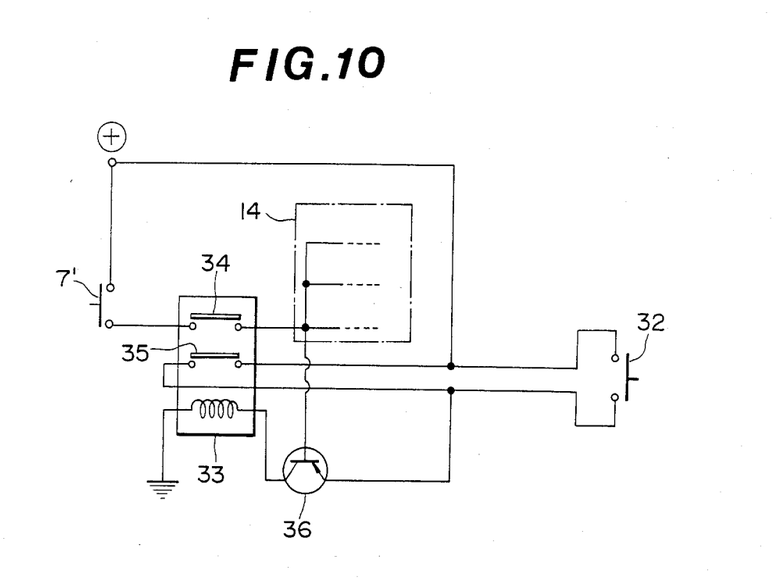
FIG. 10 is an additional circuit diagram of the lubricating oil replacement timing monitoring system shown in FIG. 7 to which a limit switch 32 is added for detecting whether an oil filler cap for supplying the engine lubricating oil is opened.

FIG. 10 shows an alternative of the clear switch unit 7 wherein a limit switch 32 for detecting that an oil filler cap of the engine (not shown) is opened is additionally provided. When the filler cap is opened, the self-returning limit switch 32 is closed so that a self-holding relay 33 is energized through a third transistor 36. At this time, a contact 34 (in FIG. 7 the contact 34 corresponds to a bold line indicated by *) is closed. Therefore, the clear operation through the clear switch 7' is enabled. With the contact 34 closed, the relay 14 also shown in FIG. 7 is actuated when the switch 7' is pushed and simultaneously the third transistor 36 turns off because of equal potential between base and emitter thereof. Thereafter the relay 33 is deenergized so that two attached contacts 34 and 35 are opened. In other words, the clear switch 7' is now electrically isolated from the rest of the clear unit. Consequently, once the clear operation is performed by the clear switch 7', erroneous operation of the clear switch 7' can be prevented until the filler cap is again opened. Alternatively, a protective cover for preventing unintentional depression of the clear switch 7' may be provided.

Figure 11A:
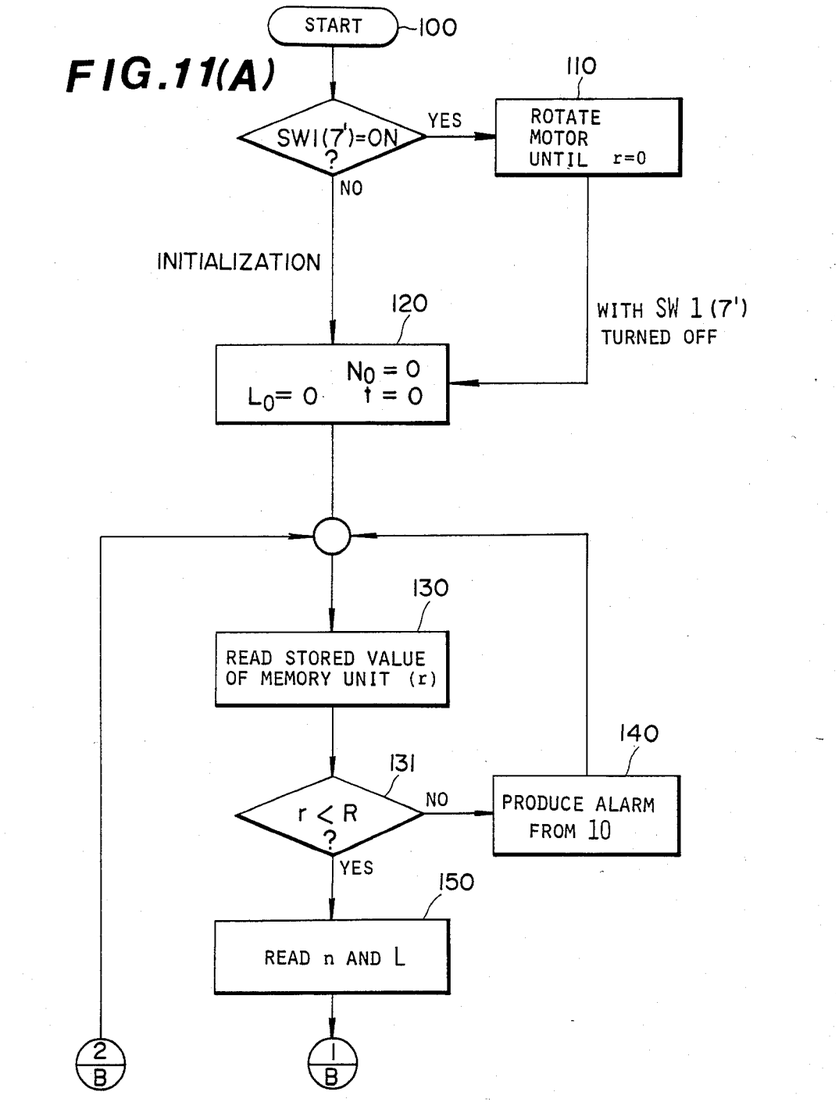
FIGS. 11(A) and 11(B) are detailed flowchart in combination which describe the execution sequence of a control unit 1 particularly shown in FIG. 5 for calculating the total amount of soot suspended in the lubricating oil so as to monitor the life of the lubricating oil.
Figure 11B:
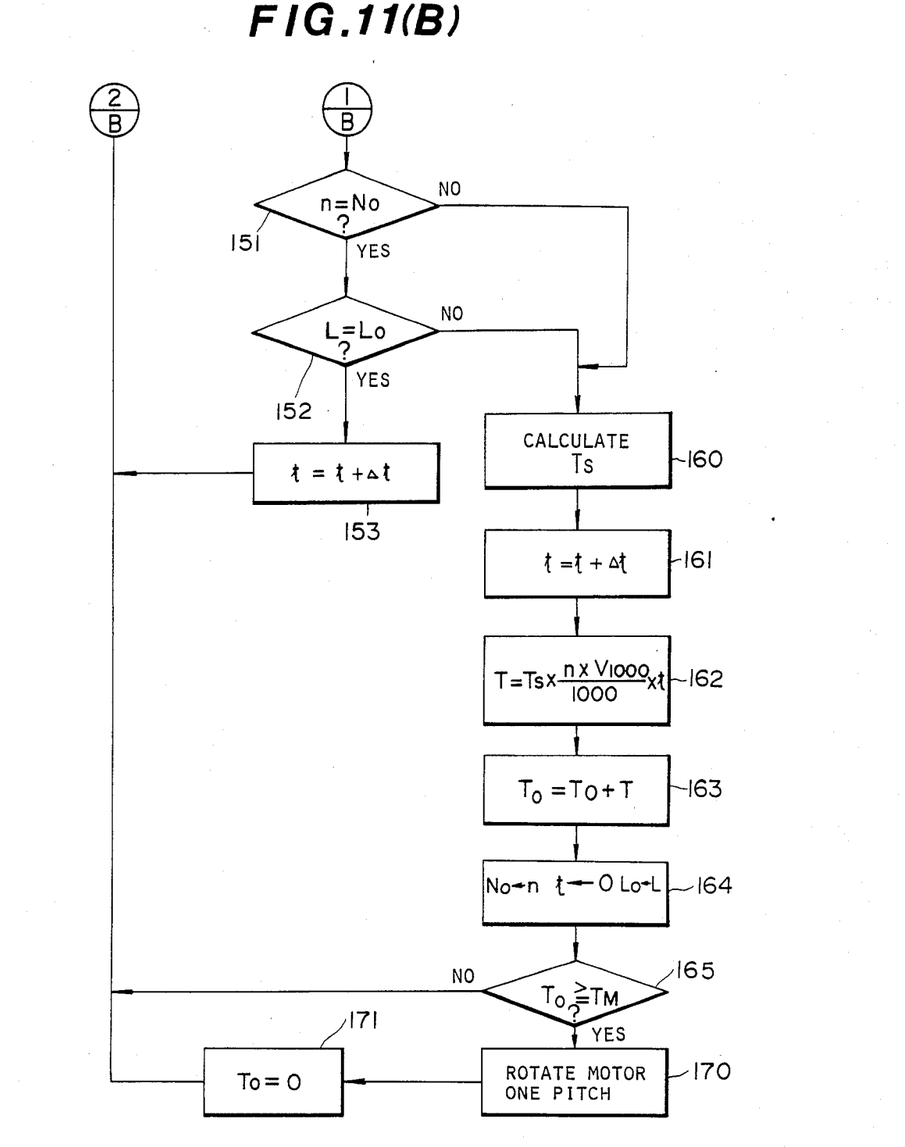

FIGS. 11(A) and 11(B) shows in combination a processing flowchart by which the oil replacement timing monitoring system typically shown in FIG. 6 is executed.

Upon the completion of filling a lubricating oil crankcase at the full amount through the filler cap, the clear switch 7' (SW1) is kept closed until the step motor 17 in the additive memory unit 11 rotates through a predetermined angle to reduce the resistance value r of the variable resistor 18 to zero. When the resistance value r becomes zero, the relay 14 is deenergized, as appreciated from FIG. 7, so that the motor 17 stops. Upon the completion of the clear operation described above, the microcomputer 1 initializes after confirming the switching position of clear switch 7' so that each variable Lo, No, and t is zeroed in step 120.

If the memory value r is not zeroed with the clear switch 7' turned on, the microcomputer 1 sends a pulse signal having a predetermined width to the motor 17 so as to smoothly reduce the memory value r to zero (r=0) in step 110. Next in step 130, the microcomputer 1 reads the resistance value r of the additive memory unit 11 during the operation of the engine and goes to step 150 via step 131 if the resistance value r is less than a predetermined limit value R which corresponds to a maximum value of the total amount of soot gathered and suspended in the oil that can be intermixed until the end of life. If the value of r equals or exceeds the limit value R, the microcomputer 1 outputs the alarm signal into the alarm unit 10 in step 140 for notifying the vehicle's occupant that the lubricating oil should be changed since total amount of soot in the oil exceeds the allowable maximum limit value, i.e., the service life of the lubricating oil has ended. In the step 150, the microcomputer 1 reads data on both current engine speed n and load L to check to see if either current values n or L is different from each previously read value No and Lo in step 151 and step 152. If both current engine speed n and load L remain unchanged by confirmation in steps 151 and 152, an interval of time Δt corresponding to a processing time of the microcomputer 1 to repeat the programmed routine is accumulated to update the time to in step 153 as t=t+Δt and the routine returns to the step 130. It is seen that in this case there is no need for the microcomputer 1 to calculate the dynamic amount of soot Ts since there is a change in neither the engine speed n nor engine load L. If the difference exists in the step 151 or 152, Ts is calculated immediately in step 160 expressed as Equation (1) with the previously read value No substituted as the engine speed n or with the previously read value Lo substituted as the load L and then in step 162 T is calculated in such a formula as $$T = Ts \times \frac{n \times V_{1000}}{1000} \times t,$$

wherein n indicates the previously read engine speed and t indicates the total interval of time (t=t+Δt) accumulated in step 161. Thereafter, the calculated value of T is added to the previously calculated value To to sum the total value of To in step 163. In step 165, the additively calculated result To in the step 163 is checked to see if it agrees with a value of TM (TM indicates a value of the total amount of soot such that the motor 17 of the memory unit 11 is rotated by one pitch of the attached gear so as to store the additively calculated result, To, i.e., $T_M$ into the variable resistor 18). If To≧TM, the microcomputer 1 outputs a signal to command the motor 17 to rotate one pitch in step 170 as described above and returns to the step 130 with the additively calculated result To zeroed in step 171. Before checking to see if the additively calculated value To is more than the value of $T_M$ in the step 165, the total interval of time t during which there is a change in neither the engine speed n nor engine load L is zeroed in step 164 and the engine speed No and load Lo used in the calculation of Ts in the step 160 are updated so as to substitute the current read value n and L as the previously read values No and Lo for the preparation of the subsequent calculation of Ts. This is done in step 164. If To<TM, the microcomputer 1 returns directly to the step 130 to continue the calculating operation described above. If the resistance value r becomes equal to or exceeds maximum value R in step 131 as described hereinabove, the microcomputer 1 sends a signal to the alarm unit 10 to produce the alarm. In this way, the value of total amount of soot suspended in the oil from the time when the lubricating oil is renewed is additively stored in the memory unit 11 as the resistance value r of the variable resistor 18 by means of the motor 17. In this way, the static amount of soot T is continuously calculated whenever the control unit processing time $\Delta t$ is repeated in the case when either the engine speed n or engine load L changes. In the case when neither the engine speed n nor engine load L changes, the amount of soot T is not calculated but only the processing time $\Delta t$ is accumulated as the travel interval of time t. In the case when either engine speed n or engine load L starts to change, the amount of soot T also starts to be calculated on a basis of the previously read value No or Lo immediate before the change occurs.

As described hereinbefore, the engine lubricating oil change timing monitoring system according to the present invention comprises a microcomputer which calculates the amount of soot suspended in the lubricating oil simply on a basis of engine speed and engine load whereby the expired life of engine oil can accurately be detected. The timing at which the engine oil needs to be changed can be accurately determined. The burden on the user can be relieved and the engine can be spared damage by virtue of the elimination of improper replacement timing of the lubricating engine oil.

It should be noted that since an electronic engine fuel supply control system uses the microcomputer which inputs the data on engine speed n and engine load L for supplying an appropriate amount of fuel into the engine, the microcomputer can directly be used in this engine lubricating replacement timing monitoring system. Therefore, the advantage is that mere incorporation of the additive memory unit of the nonvolatile type described hereinabove into the engine control system configuration permits the parallel construction of the engine lubricating replacement timing monitoring system.

It will be fully understood by those skilled in the art that the foregoing description is in terms of preferred embodiment of the present invention wherein various changes and modifications may be made without departing from the spirit and scope of the present invention, which is to be defined by the appended claims.

What is claimed is:

1. An engine lubricating oil replacement timing monitoring system for an automotive vehicle which indicates to a vehicle occupant the end of service life of the engine lubricating oil, comprising:
   (a) a first sensor which detects the engine speed (n);
   (b) a second sensor which detects the load on the engine (L);
   (c) a calculating means which calculates the amount of soot (T) presently contained in the engine lubricating oil from the detected values of said first and second sensors;
   (d) a memory means which receives and additively stores the calculated amount of soot in the engine lubricating oil from said calculating means so as to record the total amount of soot therein;
   (e) a judging means which judges whether the total amount of soot additively stored in said memory means arrives at a first predetermined amount (R), the first predetermined amount being a maximum allowable amount of soot suspended in the engine lubricating oil; and
   (f) an alarm unit which produces an alarm to the vehicle occupant when said judging means judges that the total amount of soot becomes equal to the first predetermined amount.

2. An engine lubricating oil replacement timing monitoring system as claimed in claim 1, wherein said calculating means comprises:
   means responsively connected to said first and second sensors for determining when one of said first and second sensor detected values changes during a unit time period $\Delta t$ corresponding to a calculation cycle time of said calculating means and for producing an indication of said determined change;
   means for adding said unit time period $\Delta t$ to an accumulated time period t corresponding to the sum of consecutive prior unit time periods $\Delta t$ over which neither one of said first and second sensor detected values were determined to have changed;
   a calculating block responsive to said change determining means, for responding to the presence of said determined change indication to calculate a rate Ts at which soot is continuously suspended in the lubricating oil using said first and second sensor detected values as detected immediately prior to when one of said first and second sensor detected values changed, and for calculating a soot amount T based on said soot rate Ts and said accumulated time t; and
   means for resetting said accumulated time period t to zero after said rate Ts is calculated.

3. An engine lubricating oil replacement timing monitoring system as set forth in claim 2, wherein said calculating and judging means constitute a microcomputer and said unit period of time is a calculation processing time of the microcomputer.

4. An engine lubricating oil replacement timing monitoring system as set forth in claim 2, wherein said calculating block of said calculating means returns the calculated amount of soot (T) to zero so as to update the calculation thereof whenever the calculated amount of soot (T) becomes equal to or more than a second predetermined amount (TM).

5. An engine lubricating oil replacement timing monitoring system as set forth in claim 1, which further comprises a clear means for operatively returning the stored value of said memory means to zero when the lubricating oil is changed.

6. An engine lubricating oil replacement timing monitoring system as set forth in claim 4, which further comprises a clear means for operatively returning the stored value of said memory means to zero when the lubricating oil is exchanged.

7. An engine lubricating oil replacement monitoring system as set forth in claim 6, wherein said calculating block sends a voltage signal corresponding to the second predetermined amount of soot into said memory means whenever the calculated amount of soot becomes equal to or more than the second predetermined amount of soot and said memory means comprises:
   (a) a permanent memory which additively stores a value corresponding to the second predetermined amount of soot whenever the voltage signal is received from said calculating block and the additively stored value is returned to zero by said clear means; and (b) a driving means, interlocked with said permanent memory, which drives said permanent memory to change the stored value of said permanent memory by the value corresponding to the second predetermined amount of soot whenever the voltage signal is received from said calculating block to return the stored value of said permanent memory to zero when actuated by said clear means.

8. An engine lubricating oil replacement timing monitoring system as set forth in claim 7, wherein said permanent memory is a variable resistor, said driving means is a motor whose rotating force is transmitted to the variable resistor so as to change the resistance value of said variable resistor, and the voltage signal corresponding to the second predetermined amount of soot to be sent from said calculating block into said motor commands said motor to rotate one pitch.

9. An engine lubrication oil replacement timing monitoring system as set forth in claim 8, wherein a rotating shaft of said motor is interlocked with a slidable contact of said variable resistor and said clear means comprises:

(a) a first switch connected to a plus voltage supply;

(b) a first self-holding relay having two contacts and an electromagnetic coil, one end of each of said two contacts and said coil being connected to said first switch, the other end of one of said two contacts being connected to the plus voltage supply and to one end of said variable resistor, the other end of said resistor being grounded, and the other end of said remaining contact being connected to one terminal of said motor, the other terminal of said motor being grounded;

(c) a first transistor, the collector of which is connected to the other end of said coil of the relay and the emitter of which is grounded; and (d) a comparator, the output terminal of which is connected to the base of said transistor, the inverting input of which terminal is grounded, and the noninverting input terminal of which is connected to the slidable contact of said variable resistor, whereby said motor continues to rotate until the resistance value of said variable resistor is returned to zero when said first switch is closed.

10. An engine lubricating oil replacement timing monitoring system as set forth in claim 8, which further comprises: a soot indicator having a pointer which responds to the resistance value of said variable resistor to assume an angular orientation unique to that resistance value so as to display the life of the lubricating oil.

11. An engine lubricating oil replacement system as set forth in claim 1, wherein said alarm unit comprises a buzzer.

12. An engine lubricating oil replacement timing monitoring system as set forth in claim 1, wherein said alarm unit comprises:

(a) an oil pressure warning lamp which turns off when the oil pressure of the lubricating oil exceeds a predetermined value; and (b) a warning lamp blinking circuit which turns said oil pressure warning lamp on and off at a predetermined repetition rate when said judging means judges that the total amount of soot stored in said memory means exceeds the first predetermined amount.

13. An engine lubricating oil replacement timing monitoring system as set forth in claim 12, wherein said alarm unit further comprises a switching element which turns on so as to actuate said warning lamp blinking circuit when said judging means judges that the total amount of soot stored in said memory means exceeds the first predetermined amount.

14. An engine lubricating oil replacement timing monitoring system as set forth in claim 1, which further comprises a fuel select switching means, connected to said calculating means, for outputting a signal indicating the kind of fuel supplied to the engine so as to correct the calculated amount of soot on a basis of the kind of supplied fuel in terms of the fuel quality.

15. An engine lubricating oil replacement timing monitoring system as set forth in claim 1, which further comprises a lubricating oil select switching means, connected to said judging means, for outputting a signal indicating the kind of lubricating oil used in the engine so as to modify said first predetermined amount of soot of said judging means.

16. An engine lubricating oil replacement timing monitoring system as set forth in claim 9, which further comprises:

(a) a self-return limit switch which closes when an oil filler cap of the engine is opened;

(b) a second self-holding relay having two contacts and an electromagnetic coil, one end of one of said two contacts being connected to said first switch and the other end thereof being connected to one end of each of said two contacts and coil of said first self-holding relay, said remaining contact thereof being connected across said self-return limit switch with one end thereof being connected to said plus voltage supply, and one end of said coil being grounded; and (c) a second transistor, the collector of which is connected to the other end of the coil of said second self-holding relay, the emitter of which is connected to said self-return limit switch and the base of which is connected to one end of the other contact of said second self-holding relay, whereby said clear means functions only when the oil filler cap of the engine is opened.

17. An engine lubricating oil replacement timing monitoring system as set forth in claim 2, wherein said calculating block calculates the rate of amount of soot (Ts) in such an equation as $Ts = 20.4 f_1(n,L)^{2.1} \times Cof_2(n) \times (0.16 \times f_s(n,L) + 0.04) \times K^{-1}$ using a table look up technique, wherein Ts is in mg/km, $f_1(n,L)$ denotes an exhaust gas smoke value in Bosch smoke units determined by the engine speed (n) and engine load (L), Co is expressed as $3 \times 10^4 C \eta V \div V_{1000}$ (wherein C denotes engine total displacement in m$^3$, $\eta V$ denotes engine volumetric efficiency in %, and $V_{1000}$ denotes a predetermined vehicle speed in km/h when the engine speed is 1000 revolutions per minute), $Cof_2(n)$ denotes an engine intake air flow quantity in m$^3$/km, $f_s(n,L)$ denotes an exhaust gas recirculation rate (EGR) of the particular model of engine, and K denotes a constant of carbon weight ratio relating to an insoluble benzene in the lubricating oil and said calculating block calculates the amount of soot (T) from the calculated rate of amount of soot (Ts) which can be expressed in mg as $$T = Ts \times \frac{n \times V_{1000}}{1000} \times t.$$

wherein n indicates the previously read engine speed, t operating time in hours, Ts the soot rate, which changes depending on the condition engine speed and load.

18. A method of monitoring engine lubricating oil replacement timing comprising the steps of:
(a) determining the proportion of impurities at which the engine lubricating oil is no longer acceptably effective for engine lubrication, and producing an allowable limit value indicative thereof;
(b) sensing engine operating conditions and producing sensor signals indicative thereof;
(c) calculating the quantity of soot produced by the engine and admixed into the oil in accordance with the sensor signals;
(d) adding the calculated value of soot quantity to a total soot value, which represents the sum of all calculated values since the last previous change of engine lubricating oil, in order to update the total contaminant value;
(e) comparing the total contaminant value to the soot limit value;
(f) repeating steps (b) through (e) until the total calculated value exceeds the limit value; and
(g) indicating to a vehicle occupant that engine lubricating oil should be changed.

19. The method of claim 18, further comprising the step of indicating to the vehicle occupant the current total contaminant value, this step being repeated concurrently with steps (b) through (e) of claim 18.

20. The method of claim 18, wherein said adding step is performed by rotating a shaft to which the contact rotor of a variable resistor is connected through an angle commensurate with the calculated value of soot quantity, whereby the resistance of the variable resistor represents the total soot value.

21. The method of claim 18, wherein said indicating step is performed by activating a buzzer.

22. The method of claim 18, wherein said indicating step is performed by activating a blinking light.

23. The method of claim 18, wherein the total soot value is converted to an electrical voltage which is then used to position a pivotable pointer.

24. The method of claim 18, wherein said engine operating conditions are engine speed and engine load.

* * * * *